US009791895B2

(12) United States Patent
Hsu

(10) Patent No.: US 9,791,895 B2
(45) Date of Patent: Oct. 17, 2017

(54) CONVERTIBLE AXLE STRUCTURE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 289 days.

(21) Appl. No.: 14/584,003

(22) Filed: Dec. 29, 2014

(65) Prior Publication Data

US 2016/0083988 A1 Mar. 24, 2016

(30) Foreign Application Priority Data

Sep. 24, 2014 (TW) .............................. 103132899 A

(51) Int. Cl.
*E05D 3/06* (2006.01)
*G06F 1/16* (2006.01)

(52) U.S. Cl.
CPC .................................. *G06F 1/1681* (2013.01)

(58) Field of Classification Search
CPC .... G06F 1/1616; G06F 1/1681; G06F 1/1679; Y10T 16/547; Y10T 16/5478; Y10T 16/53824; Y10T 16/53825; Y10T 16/53832; Y10T 16/53843; Y10T 16/53864; E05D 3/12
See application file for complete search history.

(56) References Cited

U.S. PATENT DOCUMENTS

| | | | | |
|---|---|---|---|---|
| 4,242,773 A * | 1/1981 | Beigh | ...................... | E05D 3/12 16/371 |
| 8,966,715 B1 * | 3/2015 | Chen | ..................... | H04M 1/022 16/303 |
| 8,978,209 B1 * | 3/2015 | Lin | ........................ | G06F 1/1618 16/303 |
| 9,003,606 B2 * | 4/2015 | Hsu | ....................... | G06F 1/1681 16/366 |
| 9,009,919 B1 * | 4/2015 | Chiang | ................ | G06F 1/1681 16/303 |
| 9,104,381 B2 * | 8/2015 | Kuramochi | ........... | G06F 1/1681 |
| 9,201,465 B2 * | 12/2015 | Meyers | .................... | G06F 1/1681 |
| 9,261,900 B2 * | 2/2016 | Hsu | ........................... | G06F 1/16 |
| 9,265,167 B2 * | 2/2016 | Hsu | ...................... | H05K 5/0226 |
| 9,274,566 B1 * | 3/2016 | Horng | ................... | G06F 1/1681 |
| 9,310,849 B2 * | 4/2016 | Hsu | ......................... | E05D 3/122 |
| 2012/0246874 A1 * | 10/2012 | Dienst | .................... | B63B 41/00 16/302 |

(Continued)

*Primary Examiner* — Victor Batson
*Assistant Examiner* — Matthew Sullivan
(74) *Attorney, Agent, or Firm* — Rosenberg, Klein & Lee

(57) ABSTRACT

A convertible axle structure includes a first shaft, a second shaft parallel to the first shaft, and a switch member disposed between the first shaft and the second shaft. The outer wall of the first shaft has a slide groove composed of a front radial slide groove portion, an axial slide groove portion, and a rear radial slide groove portion. The outer wall of the second shaft has a guide groove composed of a radial guide groove portion, a front inclined guide groove portion, and a rear inclined guide groove portion. The switch member has a first protrusion slidable in the slide groove and a symmetrical second protrusion slidable in the guide groove to guide the first shaft and the second shaft to carry out an asynchronous convertible turning.

28 Claims, 9 Drawing Sheets

(56) References Cited

U.S. PATENT DOCUMENTS

| | | | |
|---|---|---|---|
| 2015/0160695 A1* | 6/2015 | Su | E05D 3/12 |
| | | | 16/366 |
| 2015/0173218 A1* | 6/2015 | Hsu | E05D 3/12 |
| | | | 16/366 |
| 2015/0189777 A1* | 7/2015 | Hsu | H05K 5/0226 |
| | | | 16/366 |
| 2015/0327383 A1* | 11/2015 | Hsu | H05K 5/0226 |
| | | | 16/366 |

* cited by examiner

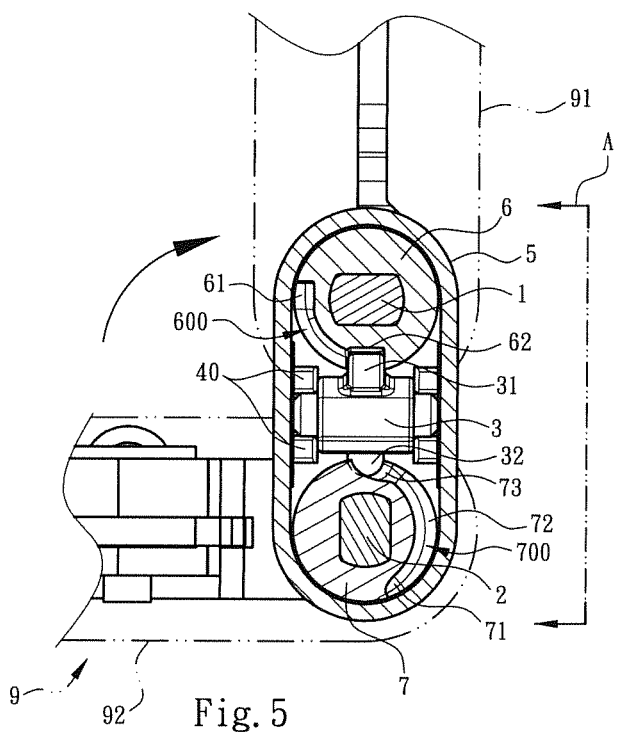
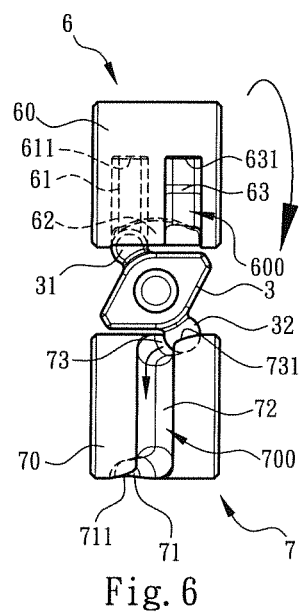
Fig. 5
Fig. 6

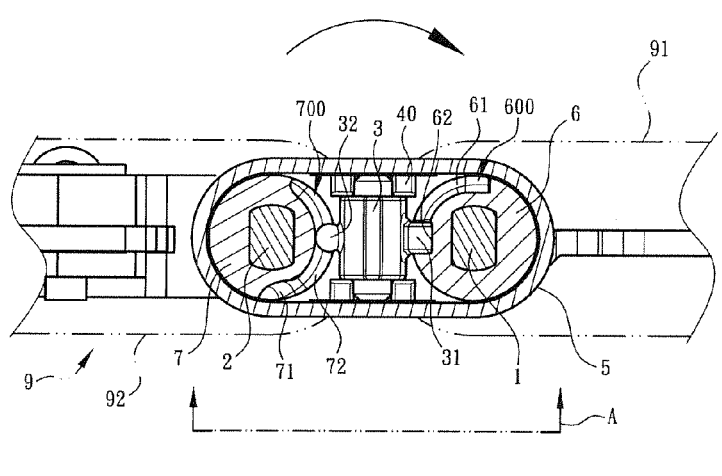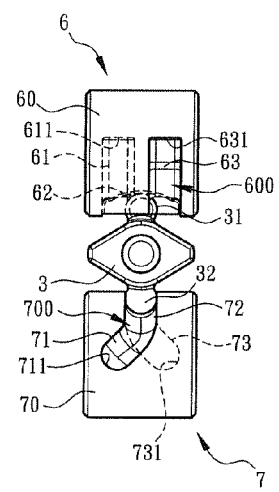
Fig. 9
Fig. 10

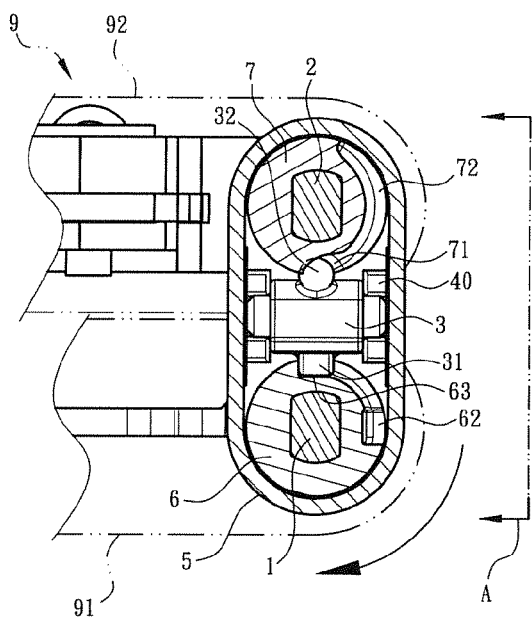
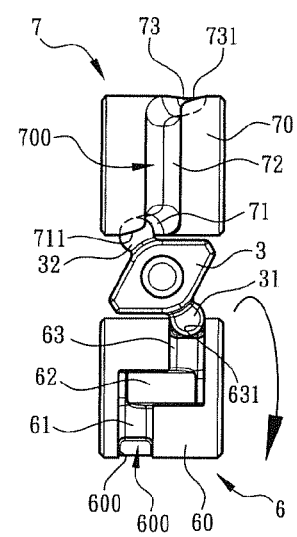
Fig. 15                    Fig. 16

CONVERTIBLE AXLE STRUCTURE

BACKGROUND OF THE INVENTION

1. Field of the Invention

The present invention relates to a convertible axle structure of a hinge with two shafts mounted to an electronic article which can be opened and closed, and more particularly to a convertible axle structure which uses a slide groove to guide the shafts so as to provide a smooth turning, eliminate noises and shorten the distance between the shafts.

2. Description of the Prior Art

An electronic article, such as a notebook, a cell phone, a PDA, a digital camera, an electronic book and the like, can be opened and closed. The electronic article comprises a display module (for example: a screen), a machine body module (for example: a keyboard, a mainframe), and a single-shaft hinge between the display module and the machine body module. The single-shaft hinge can be driven to reciprocate by applying with an external force, so that the display module can be opened or closed relative to the machine body module. This is beneficial for operation and storage. However, the electronic article with the single-shaft hinge is opened not more than 180 degrees.

For the display module and the machine body module of the electronic article to have more operation modes and to be used widely, a dual-shaft hinge disposed between the display module and the machine body module is developed on the market. The display module can be turned 360 degrees relative to the machine body module to bring different operation modes.

The aforesaid dual-shaft hinge comprises two parallel shafts disposed between the display module and the machine body module and bearing members to be pivotally connected with the shafts. The display module and the machine body module are connected with the shafts, respectively. Each of the shafts is provided with a roller. The roller surface of the roller has a concave portion. A switch member is provided between the rollers of the shafts. When in use, the switch can be selectively engaged in the concave portion of either roller to limit turning of the shaft of one roller and to release the shaft of another roller to turn so as to control the display module and the machine body module to be turned at a desired angle in an asynchronous-tuning type, such that the electronic article can bring different operation modes.

However, the aforesaid dual-shaft hinge has an interval between the switch member and the concave portion of the roller for the switch member to move. The switch member is pushed by the outer wall of one roller to be engaged in the concave portion of another roller. Therefore, it is easy to bring a vibration when the switch member is engaged in the concave portion of the roller. This may influence turning of each shaft and make a noise. Besides, it is hard to shorten the distance between the shafts because of the design of the interval for the switch member, so it is unfavorable to make the electronic article thinner. Accordingly, the inventor of the present invention has devoted himself based on his many years of practical experiences to solve these problems.

SUMMARY OF THE INVENTION

The primary object of the present invention is to provide a convertible axle structure for an existing electronic article to be opened and closed, and more particularly to a convertible axle structure which uses a slide groove to guide shafts so as to provide a smooth turning, eliminate noises and shorten the distance between the shafts. The present invention can solve the problems of the prior art. The conventional dual-shaft hinge has an interval between the switch member and the concave portion of the roller for the switch member to move. It is easy to bring a vibration when the switch member is engaged in the concave portion of the roller to influence turning of each shaft and to make a noise. It is hard to shorten the distance between the shafts.

In order to achieve the aforesaid objects, the convertible axle structure of the present invention comprises a first shaft, a second shaft parallel to the first shaft, and a switch member disposed between the first shaft and the second shaft, the first shaft and the second shaft being jointly pivoted to at least one bearing member.

The outer wall of the first shaft has a slide groove. The slide groove includes a front radial slide groove portion which extends along the turning direction of the first shaft, an axial slide groove portion which turns the slide direction of the front radial slide groove portion and extends along the axial direction of the first shaft, and a rear radial slide groove portion which turns the slide direction of the axial slide groove portion and extends along the turning direction of the first shaft.

The outer wall of the second shaft has a guide groove. The guide groove includes a radial guide groove portion which extends along the turning direction of the second shaft and has a path corresponding in position to a path integrated by the front radial slide groove portion, the axial slide groove portion, and the rear radial slide groove portion. A front inclined guide groove portion extends obliquely from one end of the radial guide groove portion and corresponds in position to the front radial slide groove portion. A rear inclined guide groove portion extends obliquely from another end of the radial guide groove portion and corresponds in position to the rear radial slide groove portion. The slide groove and the guide groove have a reciprocal segmented relationship of different paths.

The switch member has a first protrusion slidable in the slide groove and a second protrusion slidable in the guide groove at two opposing sides thereof. The first shaft and the second shaft are turned through the first protrusion and the second protrusion of the switch member to slide in the slide groove and the guide groove, respectively.

When in use, the first shaft is connected with a display module of an external electronic article and the second shaft is connected with a machine body module of the electronic article, such that the first shaft and the second shaft are located at the junction of the display module and the machine body module. When the display module is closed to the top surface of the machine body module, the first protrusion is slid to be in the front radial slide groove portion, and the second protrusion is slid to be in the rear inclined guide groove portion. During the first shaft and the second shaft are turned relatively, the first protrusion and the second protrusion of the switch member are located between the first shaft and the second shaft consistently.

When the display module is opened upwardly and turned 90 degrees, the front radial slide groove portion will be turned along the turning direction along with the first shaft, such that first protrusion is displaced vertically from the front radial slide groove portion to one end of the axial slide groove portion. When the display module is turned towards one side of the machine body module to 180 degrees, the first protrusion will be stopped in the axial slide groove portion to brake turning of the first shaft. At this time, the rear inclined guide groove portion is turned along the turning direction along with the second shaft. The second protrusion is first displaced obliquely and then vertically from the rear inclined guide groove portion to the radial guide groove portion. During the second protrusion is moved from the rear inclined guide groove portion to the radial guide groove portion, the first protrusion is moved transversely from one end of the axial slide groove portion to the middle section of the axial slide groove portion.

When the display module is turned downwardly towards the machine body module to 270 degrees, the radial guide groove portion is turned along the turning direction along with the second shaft. The second protrusion is first displaced vertically and then obliquely from the radial guide groove portion to the front inclined guide groove portion. During the second protrusion is moved from the radial guide groove portion to the front inclined guide groove portion, the first protrusion is moved transversely from the middle section of the axial slide groove portion to the other end of the axial slide groove portion. When the display module is turned 360 degrees to lean against the bottom of the machine body module, the rear radial slide groove portion will be turned along the turning direction along with the first shaft. The first protrusion is moved vertically from the other end of the axial slide groove portion to the rear radial slide groove portion.

During the first shaft and the second shaft are turned relatively, the first protrusion of the switch member is to slide in the front radial slide groove portion, the axial slide groove portion, and the rear radial slide groove portion, and the second protrusion is to slide in the front inclined guide groove portion, the radial guide groove portion, and the rear inclined guide groove portion so as to guide the first shaft and the second shaft to carry out an asynchronous convertible turning, such that the first shaft and the second shaft can be turned smoothly to bring an asynchronous turning. The present invention can solve the problems of the prior art. The problems are that it is easy to bring a vibration when the switch member is engaged in the concave portion of the roller and that it may make a noise. The present invention doesn't have the interval for the switch member to move, so it can shorten the distance between the first shaft and the second shaft and it is favorable to make the electronic article thinner.

Preferably, the switch member is pivotally disposed between the first shaft and the second shaft. The pivot axis of the switch member passes between the first shaft and the second shaft. Preferably, the convertible axle structure comprises a plurality of bearing members which includes a first bearing member and a second bearing member. Each of the first shaft and the second shaft has a pivot portion and a fixed portion at two ends thereof. The first shaft and the second shaft are jointly connected with the first bearing member and the second bearing member. The first bearing member and the second bearing member are provided with two symmetrical pivot seats disposed between the first bearing member and the second bearing member for the switch member to be pivotally connected between the two pivot seats.

Preferably, the convertible axle structure further comprises two symmetrical stop faces disposed between the first shaft and the second shaft and located at a position where the switch member is not interfered. Each of the first shaft and the second shaft is provided with a protruding block. The stop faces are adapted to stop the protruding blocks of the first shaft and the second shaft. The protruding blocks of the first shaft and the second shaft are disposed in the same direction. Preferably, the stop faces are disposed on the surface of the second bearing member. Each of the first shaft and the second shaft is provided with a cam. The protruding block is disposed on the cam.

Preferably, the first shaft is provided with a first roller. The first roller has a roller surface to surround the outer wall of the first shaft. The slide groove is disposed on the roller surface of the first roller. The second shaft is provided with a second roller. The second roller has a roller surface to surround the outer wall of the second shaft. The guide groove is disposed on the roller surface of the second roller. The switch member is located between the first bearing member and the second bearing member.

Preferably, each of the first shaft and the second shaft is provided with a plurality of elastic plates against the bearing member.

BRIEF DESCRIPTION OF THE DRAWINGS

FIG. 5 is a schematic view showing the next use state of FIG. 3;

FIG. 6 is a schematic view taken along line A of FIG. 5 to show the arrangement of the first roller and the second roller;

FIG. 9 is a schematic view showing the next use state of FIG. 7;

FIG. 10 is a schematic view taken along line A of FIG. 9 to show the arrangement of the first roller and the second roller;

FIG. 15 is a schematic view showing the next use state of FIG. 13; and

FIG. 16 is a schematic view taken along line A of FIG. 15 to show the arrangement of the first roller and the second roller.

DETAILED DESCRIPTION OF THE PREFERRED EMBODIMENTS

Figure 1:
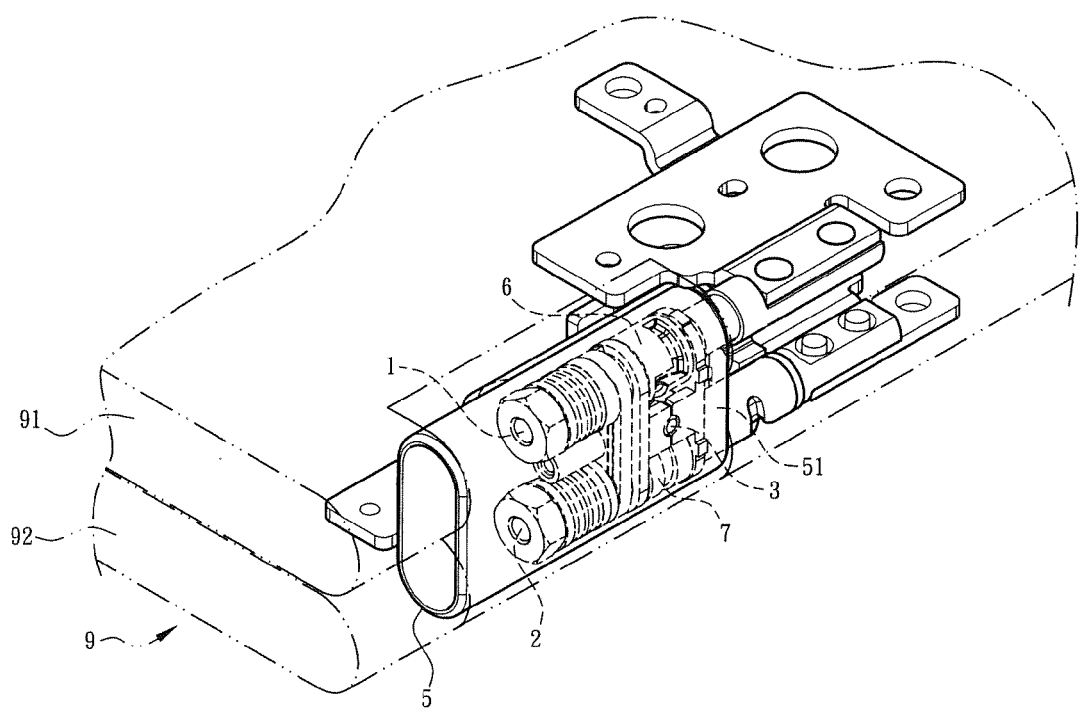
FIG. 1 is a perspective view according to a preferred embodiment of the present invention.
Figure 2:
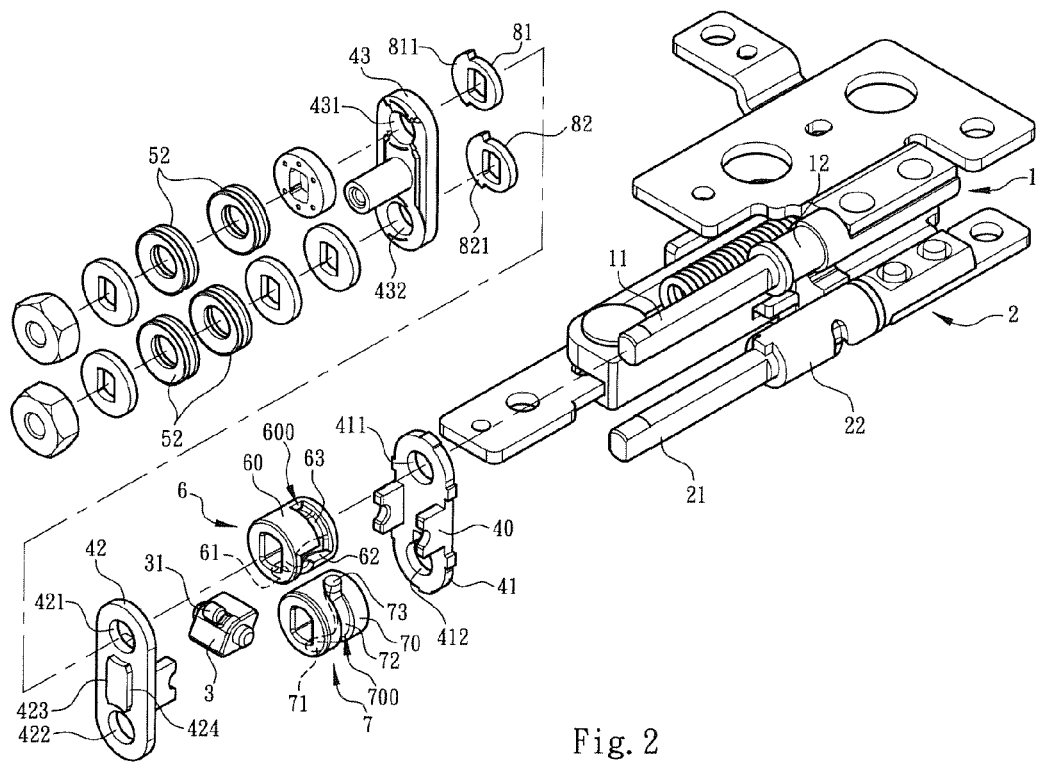
FIG. 2 is an exploded view according to the preferred embodiment of the present invention.

Embodiments of the present invention will now be described, by way of example only, with reference to the accompanying drawings.

Referring to FIG. 1 to FIG. 4, the present invention discloses a convertible axle structure which can be applied to an electronic article, such as a notebook, a cell phone, a PDA, a digital camera, an electronic book and the like, for the electronic article to be opened and closed. The convertible axle structure comprises a first shaft 1, a second shaft 2 parallel to the first shaft 1, a switch member 3 disposed between the first shaft 1 and the second shaft 2, at least one bearing member, and a casing 5.

In an embodiment, the present invention comprises a plurality of bearing members which includes, a first bearing member 41, a second bearing member 42, and a third bearing member 43. The first bearing member 41, the second bearing member 42, and the third bearing member 43 are in a plate-like shape and secured in the casing 5. The first bearing member 41 covers an opening 51 at an end of the casing 5. The first bearing member 41, the second bearing member 42, and the third bearing member 43 each have a first shaft hole 411, 421, 431 and a second shaft hole 412, 422, 432. The casing 5 is in a sleeve shape to accommodate the first shaft 1 and the second shaft 2, and is positioned at the junction of a display module 91 (for example: a screen) and a machine body module 92 (for example: a keyboard, a mainframe).

The first shaft 1 has a pivot portion 11 and a fixed portion 12 at two ends thereof. The pivot portion 11 of the first shaft 1 is pivotally connected with the first shaft holes 411, 421, 431 of the first bearing member 41, the second bearing member 42, and the third bearing member 43. The fixed portion 12 of the first shaft 1 extends out of the opening 51 of the casing 5 for connecting with the display module 91 of the electronic article 9. The second shaft 2 has a pivot portion 21 and a fixed portion 22 at two ends thereof. The pivot portion 21 of the second shaft 2 is pivotally connected with the second shaft holes 412, 422, 432 of the first bearing member 41, the second bearing member 42, and the third bearing member 43. The fixed portion 12 of the second shaft 2 extends out of the opening 51 of the casing 5 for connecting with the machine body module 92 of the electronic article 9. Thus, the pivot portions 11, 21 of the first shaft 1 and the second shaft 2 are jointly connected with the first bearing member 41, the second bearing member 42, and the third bearing member 43.

As shown in the drawings, in the preferred embodiment, the outer wall of the first shaft 1 has a slide groove 600. The slide groove 600 includes a front radial slide groove portion 61 which extends along the turning direction of the first shaft 1, an axial slide groove portion 62 which turns the slide direction of the front radial slide groove portion 61 and extends along the axial direction of the first shaft 1, and a rear radial slide groove portion 63 which turns the slide direction of the axial slide groove portion 62 and extends along the turning direction of the first shaft 1. One end of the front radial slide groove portion 61, away from the axial slide groove portion 62, is defined as a distal end 611. One end of the rear radial slide groove portion 63, away from the axial slide groove portion 62, is defined as a distal end 631.

The outer wall of the second shaft 2 has a guide groove 700. The guide groove 700 includes a radial guide groove portion 72 which extends along the turning direction of the second shaft 2 and has a path corresponding in position to a path integrated by the front radial slide groove portion 61, the axial slide groove portion 62, and the rear radial slide groove portion 63. A front inclined guide groove portion 71 extends obliquely from one end of the radial guide groove portion 72 and corresponds in position to the front radial slide groove portion 61. A rear inclined guide groove portion 73 extends obliquely from another end of the radial guide groove portion 72 and corresponds in position to the rear radial slide groove portion 63.

One end of the front inclined guide groove portion 71, away from the radial guide groove portion 72, is defined as a distal end 711. One end of the rear inclined guide groove portion 73, away from the radial guide groove portion 72, is defined as a distal end 731. The distal end 711 of the front inclined guide groove portion 71 corresponds to the axial position of the front radial slide groove portion 61, and the distal end 731 of the rear inclined guide groove portion 73 corresponds to the axial position of the rear radial slide groove portion 63. Accordingly, the slide groove 600 and the guide groove 700 have a reciprocal segmented relationship of different paths.

The switch member 3 has a first protrusion 31 and a second protrusion 32 at two opposing sides thereof. The first protrusion 31 is adapted to slide in the front radial slide groove portion 61, the axial slide groove portion 62, and the rear radial slide groove portion 63 of the slide groove 600. The second protrusion 32 is adapted to slide in the front inclined guide groove portion 71, the radial guide groove portion 72, and the rear inclined guide groove portion 73 of the guide groove 700. The first shaft 1 and the second shaft 2 are turned through the first protrusion 31 and the second protrusion 32 of the switch member 3 to slide in the slide groove 600 and the guide groove 700, respectively. Along with turning of the first shaft 1, the front radial slide groove portion 61 is to face the rear inclined guide groove portion 73; the axial slide groove portion 62 is to face the radial guide groove portion 72; and the rear radial slide groove portion 63 is to face the front inclined guide groove portion 71.

In an embodiment, the pivot portion 11 of the first shaft 1 is provided with a first roller 6 located between the first bearing member 41 and the second bearing member 42. The first roller 6 has a roller surface 60 to surround the outer wall of the first shaft 1. The front radial slide groove portion 61, the axial slide groove portion 62, and the rear radial slide groove portion 63 of the slide groove 600 are disposed on the roller surface 60 of the first roller 6 and located between the first bearing member 41 and the second bearing member 42. The pivot portion 21 of the second shaft 2 is provided with a second roller 7 located between the first bearing member 41 and the second bearing member 42. The second roller 7 has a roller surface 70 to surround the outer wall of the second shaft 2. The front inclined guide groove portion 71, the radial guide groove portion 72, and the rear inclined guide groove portion 73 of the guide groove 700 are disposed on the roller surface 70 of the second roller 7 and located between the first bearing member 41 and the second bearing member 42.

The switch member 3 is pivotally disposed between the first shaft 1 and the second shaft 2 and located between the first roller 6 and the second roller 7. The first bearing member 41 and the second bearing member 42 are provided with two symmetrical pivot seats 40 disposed between the first bearing member 1 and the second bearing member 2 for the switch member 3 to be pivotally connected between the two pivot seats 40. The pivot axis of the switch member 3 passes between the first shaft 1 and the second shaft 2.

In another embodiment, the present invention further has two symmetrical stop faces 423, 424 disposed between the pivot portions 11, 21 of the first shaft 1 and the second shaft 2 and located at a position where the switch member 3 is not interfered. Each of the pivot portions 11, 21 of the first shaft 1 and the second shaft 2 is provided with a protruding block 811, 821. The stop faces 423, 424 are adapted to stop the protruding blocks 811, 821 of the first shaft 1 and the second shaft 2. The protruding blocks 811, 821 of the first shaft 1 and the second shaft 2 are disposed in the same direction. Specifically, the stop faces 423, 424 are disposed on the surface of the second bearing member 42, away from the switch member 3. Each of the pivot portions 11, 21 of the first shaft 1 and the second shaft 2 is provided with a cam 81, 82. The protruding block 811, 821 is disposed on the cam 81, 82.

In a further embodiment, each of the distal ends of the pivot portions 11, 21 of the first shaft 1 and the second shaft 2 is provided with a plurality of elastic plates 52 against the third bearing member 43. When the first shaft 1 and the second shaft 2 are turned, the elastic plates 52 are adapted to position the first shaft 1 and the second shaft 2 at a desired angle through the elasticity of the elastic plates 52 to generate an interference effect relative to the bearing member 43.

Figure 3:
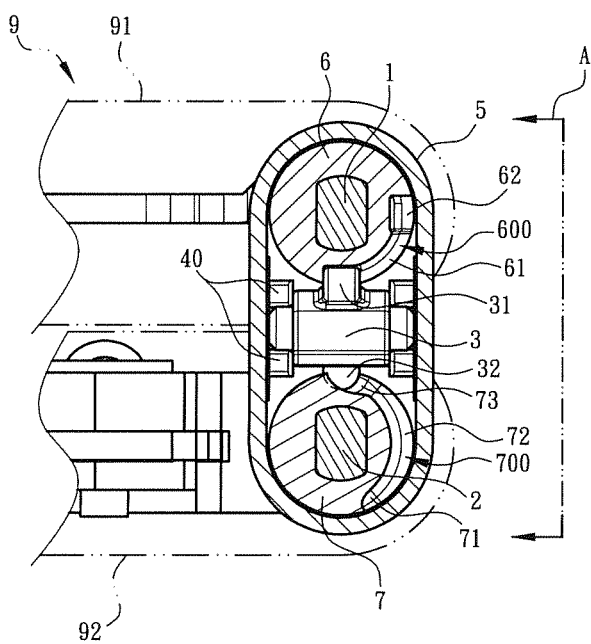
FIG. 3 is a partial side sectional view of the embodiment of FIG. 1.
Figure 4:
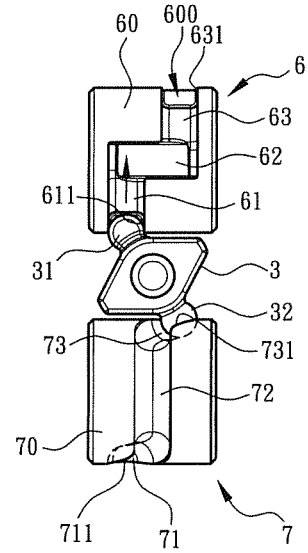
FIG. 4 is a schematic view taken along line A of FIG. 3 to show the arrangement of the first roller and the second roller.

When in use, the fixed portion 12 of the first shaft 1 is connected with the display module 91 of the electronic article 9 and the fixed portion 22 of the second shaft 2 is connected with the machine body module 92 of the electronic article 9, such that the first shaft 1 and the second shaft 2 are located at the junction of the display module 91 and the machine body module 92. FIG. 3 is a schematic view showing that the display module 91 is closed to the top surface of the machine body module 92. FIG. 4 is a schematic view taken along line A of FIG. 3 to show the arrangement of the first roller and the second roller. When the display module 91 is closed to the top surface of the machine body module 92, the first protrusion 31 is slid to be in the distal end 611 of the front radial slide groove portion 61, and the second protrusion 32 is slid to be in the distal end 731 of the rear inclined guide groove portion 73. At this time, the protruding blocks 811, 821 of the cams 81, 82 of the first shaft 1 and the second shaft 2 are against the stop faces 423, 424 of the second bearing member 42, respectively, enabling the display module 91 and the machine body module 92 to keep a parallel state.

It is noted that the first protrusion 31 and the second protrusion 32 of the switch member 3 are confined by the pivot seats 40 to be located between the first shaft 1 and the second shaft 2 consistently. Therefore, when the first shaft 1 and the second shaft 2 are turned relatively, the first protrusion 31 will pass through the front radial slide groove portion 61, the axial slide groove portion 62, and the rear radial slide groove portion 63 in sequence so that the first protrusion 31 is moved relative to the slide groove 600, and the second protrusion 32 will pass through the front inclined guide groove portion 71, the radial guide groove portion 72, and the rear inclined guide groove portion 73 in sequence so that the second protrusion 32 is moved relative to the guide groove 700.

FIG. 5 is a schematic view showing that the display module 91 is turned 90 degrees upwardly. FIG. 6 is a schematic view taken along line A of FIG. 5 to show the arrangement of the first roller and the second roller. When the display module 91 is opened upwardly and turned 90 degrees, the first shaft 1 will be turned along with the turning of the display module 91 and the front radial slide groove portion 61 will be turned along the turning direction along with the first shaft 1, such that first protrusion 1 is displaced vertically from the distal end 611 of the front radial slide groove portion 61 to one end of the axial slide groove portion 62.

Figure 7:
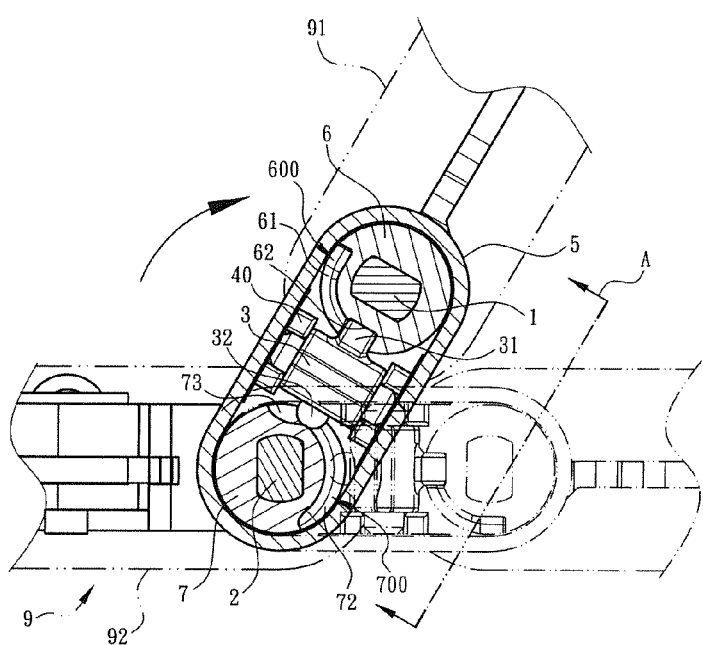
FIG. 7 is a schematic view showing the next use state of FIG. 5.
Figure 8:
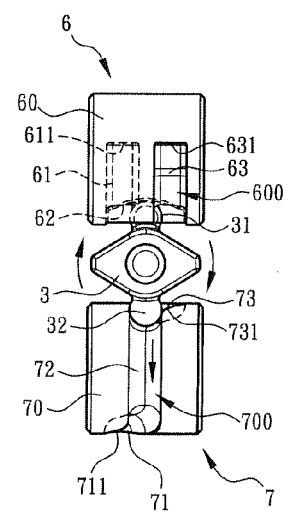
FIG. 8 is a schematic view taken along line A of FIG. 7 to show the arrangement of the first roller and the second roller.

FIG. 7 and FIG. 9 show that the display module 91 is turned from 90 degrees to 180 degrees. FIG. 8 is a schematic view taken along line A of FIG. 7 to show the arrangement of the first roller and the second roller. FIG. 10 is a schematic view taken along line A of FIG. 9 to show the arrangement of the first roller and the second roller. When the display module 91 is turned towards one side of the machine body module 92 to 180 degrees, the first protrusion 31 will be stopped in the axial slide groove portion 62 to brake turning of the first shaft 1. At this time, the second shaft 2 is turned along with the display module 91 and forces the casing 5 to turn towards one side of the machine body module 92. The rear inclined guide groove portion 73 is turned along the turning direction along with the second shaft 2. The second protrusion 32 is first displaced obliquely and then vertically from the distal end 731 of the rear inclined guide groove portion 73 to the radial guide groove portion 72. During the second protrusion 32 is moved from the rear inclined guide groove portion 73 to the radial guide groove portion 72, the first protrusion 31 is moved transversely from one end of the axial slide groove portion 62 to the middle section of the axial slide groove portion 62.

Figures 11, 12:
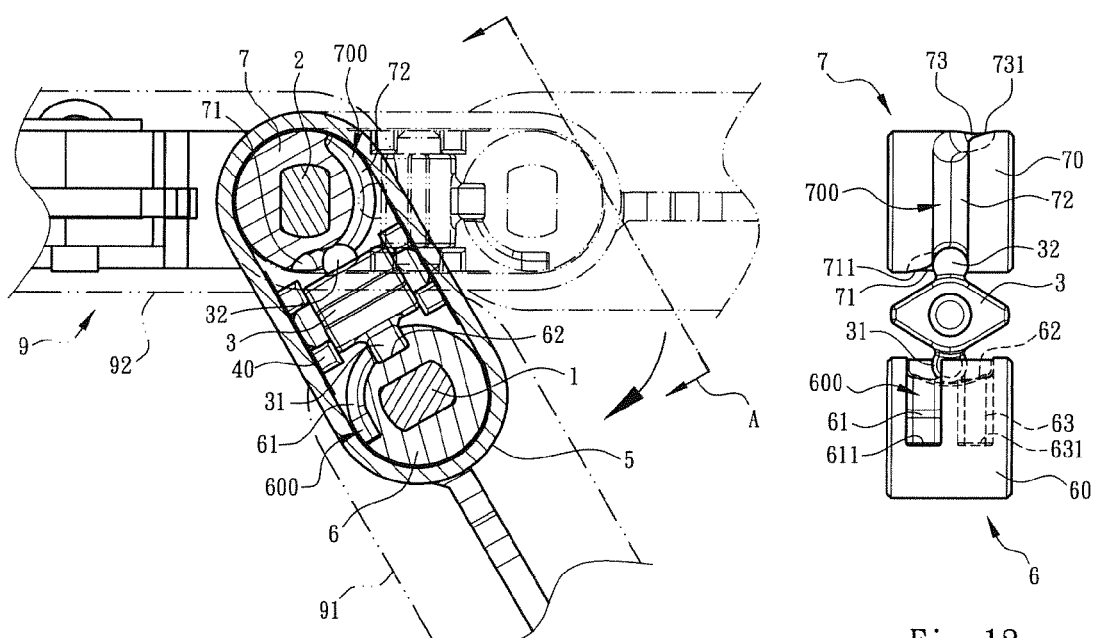
FIG. 11 is a schematic view showing the next use state of FIG. 9.
FIG. 12 is a schematic view taken along line A of FIG. 11 to show the arrangement of the first roller and the second roller.
Figure 13:
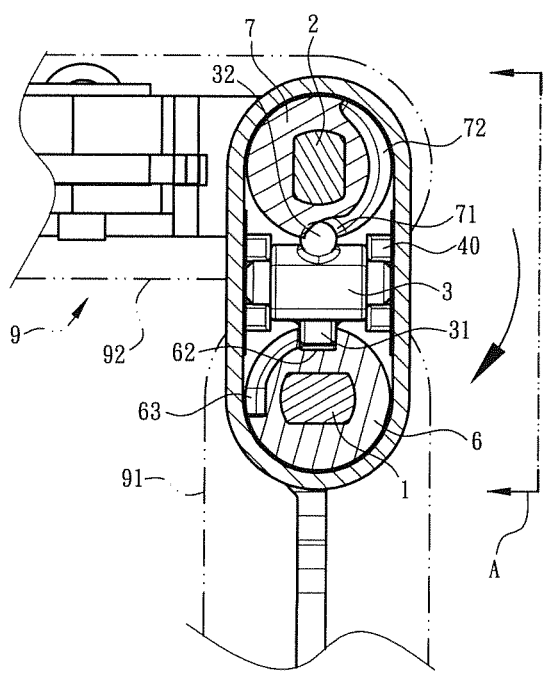
FIG. 13 is a schematic view showing the next use state of FIG. 11.
Figure 14:
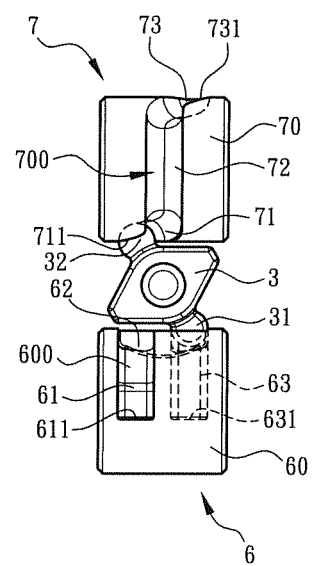
FIG. 14 is a schematic view taken along line A of FIG. 13 to show the arrangement of the first roller and the second roller.

FIG. 11 and FIG. 13 show that the display module 91 is turned from 180 degrees to 270 degrees. FIG. 12 is a schematic view taken along line A of FIG. 11 to show the arrangement of the first roller and the second roller. FIG. 14 is a schematic view taken along line A of FIG. 13 to show the arrangement of the first roller and the second roller. When the display module 91 is turned downwardly towards the machine body module 92 to 270 degrees, the second shaft 2 is turned along with the display module 91 and forces the casing 5 to turn downwardly towards the machine body module 92. At the same time, the radial guide groove portion 72 is turned along the turning direction along with the second shaft 2. The second protrusion 32 is first displaced vertically and then obliquely from the radial guide groove portion 72 to the distal end 711 of the front inclined guide groove portion 71. During the second protrusion 32 is moved from the radial guide groove portion 72 to the front inclined guide groove portion 71, the first protrusion 31 is moved transversely from the middle section of the axial slide groove portion 62 to the other end of the axial slide groove portion 62.

FIG. 15 shows that the display module 91 is turned from 270 degrees to 360 degrees. FIG. 16 is a schematic view taken along line A of FIG. 15 to show the arrangement of the first roller and the second roller. When the display module 91 is turned 360 degrees to lean against the bottom of the machine body module 92, the rear radial slide groove portion 63 will be turned along the turning direction along with the first shaft 1. The first protrusion 31 is moved vertically from the other end of the axial slide groove portion 62 to the distal end 631 of the rear radial slide groove portion 63. At this time, the protruding blocks 811, 821 of the cams 81, 82 of the first shaft 1 and the second shaft 2 are against the stop faces 423, 424 of the second bearing member 42, respectively, enabling the display module 91 and the machine body module 92 to keep a parallel state.

If the display module 91 attached to the bottom of the machine body module 92 is turned reversely for the display module 91 to attach to the top of the machine body module, the first protrusion 31 and the second protrusion 32 of the switch 3 will be slid in the slide groove 600 and the guide groove 700 reversely so as to guide the first shaft 1 and the second shaft 2 to turn reversely.

During the first shaft 1 and the second shaft 2 are turned relatively, the first protrusion 31 of the switch member 3 is to slide in the front radial slide groove portion 61, the axial slide groove portion 62, and the rear radial slide groove portion 63 and the second protrusion 32 is to slide in the front inclined guide groove portion 71, the radial guide groove portion 72, and the rear inclined guide groove portion 73 so as to guide the first shaft 1 and the second shaft 2 to carry out an asynchronous convertible turning, such that the first shaft 1 and the second shaft 2 can be turned smoothly to bring an asynchronous turning. The present invention can solve the problems of the prior art. The problems are that it is easy to bring a vibration when the switch member is engaged in the concave portion of the roller and that it may make a noise. The present invention doesn't have the interval for the switch member to move, so it can shorten the distance between the first shaft 1 and the second shaft 2 and it is favorable to make the electronic article 9 thinner.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A convertible axle structure, comprising
a first shaft,
a second shaft parallel to the first shaft, and
a switch member disposed between the first shaft and the second shaft, the first shaft and the second shaft being jointly pivoted to at least one bearing member; an outer wall of the first shaft having a slide groove, an outer wall of the second shaft having a guide groove, the slide groove and the guide groove having a reciprocal segmented relationship of different paths; the switch member having a first protrusion slidable in the slide groove and a second protrusion slidable in the guide groove at two opposing sides thereof, the first shaft and the second shaft being turned through the first protrusion and the second protrusion of the switch member to slide in the slide groove and the guide groove, respectively;
wherein the slide groove includes a front radial slide groove portion which extends along a turning direction of the first shaft, an axial slide groove portion which turns the slide direction of the front radial slide groove portion and extends along an axial direction of the first shaft, and a rear radial slide groove portion which turns the slide direction of the axial slide groove portion and extends along the turning direction of the first shaft; the guide groove including a radial guide groove portion which extends along a turning direction of the second shaft and has a path corresponding in position a path integrated by the front radial slide groove portion, the axial slide groove portion, and the rear radial slide groove portion, a front inclined guide groove portion extending obliquely from one end of the radial guide groove portion and corresponding in position to the front radial slide groove portion, a rear inclined guide groove portion extending obliquely from another end of the radial guide groove portion and corresponding in position to the rear radial slide groove portion.

2. The convertible axle structure as claimed in claim 1, wherein the front inclined guide groove portion and the rear inclined guide groove portion each have a distal end, the distal end of the front inclined guide groove portion corresponding to an axial position of the front radial slide groove portion, the distal end of the rear inclined guide groove portion corresponding to an axial position of the rear radial slide groove portion.

3. The convertible axle structure as claimed in claim 1, wherein the switch member is pivotally disposed between the first shaft and the second shaft, a pivot axis of the switch member passing between the first shaft and the second shaft.

4. The convertible axle structure as claimed in claim 3, comprising a plurality of bearing members which includes a first bearing member and a second bearing member, the first shaft and the second shaft being jointly connected with the first bearing member and the second bearing member, the first bearing member and the second bearing member being provided with two symmetrical pivot seats disposed between the first bearing member and the second bearing member for the switch member to be pivotally connected between the two pivot seats.

5. The convertible axle structure as claimed in claim 1, further comprising two symmetrical stop faces disposed between the first shaft and the second shaft and located at a position where the position of the switch member is not interfered, each of the first shaft and the second shaft being provided with a protruding block, the stop faces being adapted to stop the protruding blocks of the first shaft and the second shaft, the protruding blocks of the first shaft and the second shaft being disposed in the same direction.

6. The convertible axle structure as claimed in claim 3, further comprising two symmetrical stop faces disposed between the first shaft and the second shaft and located at a position where the position of the switch member is not interfered, each of the first shaft and the second shaft being provided with a protruding block, the stop faces being adapted to stop the protruding blocks of the first shaft and the second shaft, the protruding blocks of the first shaft and the second shaft being disposed in the same direction.

7. The convertible axle structure as claimed in claim 4, further comprising two symmetrical stop faces disposed between the first shaft and the second shaft and located at a position where the position of the switch member is not interfered, each of the first shaft and the second shaft being provided with a protruding block, the stop faces being adapted to stop the protruding blocks of the first shaft and the second shaft, the protruding blocks of the first shaft and the second shaft being disposed in the same direction.

8. The convertible axle structure as claimed in claim 5, wherein the stop faces are disposed on a surface of the second bearing member, each of the first shaft and the second shaft being provided with a cam, the protruding block being disposed on the cam.

9. The convertible axle structure as claimed in claim 6, wherein the stop faces are disposed on a surface of the second bearing member, each of the first shaft and the second shaft being provided with a cam, the protruding block being disposed on the cam.

10. The convertible axle structure as claimed in claim 7, wherein the stop faces are disposed on a surface of the second bearing member, each of the first shaft and the second shaft being provided with a cam, the protruding block being disposed on the cam.

11. The convertible axle structure as claimed in claim 1, wherein the first shaft is provided with a first roller, the first roller having a roller surface to surround the outer wall of the first shaft, the slide groove being disposed on the roller surface of the first roller, the second shaft being provided with a second roller, the second roller having a roller surface to surround the outer wall of the second shaft, the guide groove being disposed on the roller surface of the second roller, the switch member being located between the first bearing member and the second bearing member.

12. The convertible axle structure as claimed in claim 3, wherein the first shaft is provided with a first roller, the first roller having a roller surface to surround the outer wall of the first shaft, the slide groove being disposed on the roller surface of the first roller, the second shaft being provided with a second roller, the second roller having a roller surface to surround the outer wall of the second shaft, the guide groove being disposed on the roller surface of the second roller, the switch member being located between the first bearing member and the second bearing member.

13. The convertible axle structure as claimed in claim 4, wherein the first shaft is provided with a first roller, the first roller having a roller surface to surround the outer wall of the first shaft, the slide groove being disposed on the roller surface of the first roller, the second shaft being provided with a second roller, the second roller having a roller surface to surround the outer wall of the second shaft, the guide groove being disposed on the roller surface of the second roller, the switch member being located between the first bearing member and the second bearing member.

14. The convertible axle structure as claimed in claim 5, wherein the first shaft is provided with a first roller, the first roller having a roller surface to surround the outer wall of the first shaft, the slide groove being disposed on the roller surface of the first roller, the second shaft being provided with a second roller, the second roller having a roller surface to surround the outer wall of the second shaft, the guide groove being disposed on the roller surface of the second roller, the switch member being located between the first bearing member and the second bearing member.

15. The convertible axle structure as claimed in claim 8, wherein the first shaft is provided with a first roller, the first roller having a roller surface to surround the outer wall of the first shaft, the slide groove being disposed on the roller surface of the first roller, the second shaft being provided with a second roller, the second roller having a roller surface to surround the outer wall of the second shaft, the guide groove being disposed on the roller surface of the second roller, the switch member being located between the first bearing member and the second bearing member.

16. The convertible axle structure as claimed in claim 1, wherein each of the first shaft and the second shaft is provided with a plurality of elastic plates against the bearing member.

17. The convertible axle structure as claimed in claim 3, wherein each of the first shaft and the second shaft is provided with a plurality of elastic plates against the bearing member.

18. The convertible axle structure as claimed in claim 4, wherein each of the first shaft and the second shaft is provided with a plurality of elastic plates against the bearing member.

19. The convertible axle structure as claimed in claim 5, wherein each of the first shaft and the second shaft is provided with a plurality of elastic plates against the bearing member.

20. The convertible axle structure as claimed in claim 8, wherein each of the first shaft and the second shaft is provided with a plurality of elastic plates against the bearing member.

21. The convertible axle structure as claimed in claim 11, wherein each of the first shaft and the second shaft is provided with a plurality of elastic plates against the bearing member.

22. The convertible axle structure as claimed in claim 1, wherein the first shaft is connected with a display module of an external electronic article, and the second shaft is connected with a machine body module of the electronic article.

23. The convertible axle structure as claimed in claim 3, wherein the first shaft is connected with a display module of an external electronic article, and the second shaft is connected with a machine body module of the electronic article.

24. The convertible axle structure as claimed in claim 4, wherein the first shaft is connected with a display module of an external electronic article, and the second shaft is connected with a machine body module of the electronic article.

25. The convertible axle structure as claimed in claim 5, wherein the first shaft is connected with a display module of an external electronic article, and the second shaft is connected with a machine body module of the electronic article.

26. The convertible axle structure as claimed in claim 8, wherein the first shaft is connected with a display module of an external electronic article, and the second shaft is connected with a machine body module of the electronic article.

27. The convertible axle structure as claimed in claim 11, wherein the first shaft is connected with a display module of an external electronic article, and the second shaft is connected with a machine body module of the electronic article.

28. The convertible axle structure as claimed in claim 16, wherein the first shaft is connected with a display module of an external electronic article, and the second shaft is connected with a machine body module of the electronic article.

* * * * *